March 8, 1927.

E. G. HULSE

TIRE FLAP

Filed Aug. 28, 1925

1,619,868

EDISON G. HULSE
INVENTOR.

BY

*R. H. Waters*
ATTORNEY.

Patented Mar. 8, 1927.

1,619,868

UNITED STATES PATENT OFFICE.

EDISON G. HULSE, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

TIRE FLAP.

Application filed August 28, 1925. Serial No. 53,139.

This invention relates to the manufacture of articles of strip-like form capable of being fabricated in one plane or shape different from the plane or shape assumed by the article when adapted to its ultimate purpose.

The specific example selected by way of illustrating the application of this invention is that of a flap to be used in connection with the conventional mounting of a pneumatic tire on a rim, wherein the flap is interposed between these members for the protection of the former.

Heretofore the general custom of flap manufacture implies that the article be permanently impressed with an appropriate cross sectional set to accommodate the particular diameter of the tube with which it is to become associated, and in addition, with a longitudinal curvature approximating the peripheral contour of the rim member.

The present practice in sizing pneumatic tires includes a considerable range of cross sectional sizes having a common base or rim diameter. Also, the widths between the flanges of the rims, and consequently the spacing apart of the beaded edges of the tire casings mounted thereon varies with the cross sectional rating of the tires. A small cross section tire is mounted on a narrower rim than the larger sizes; thus there are numerous rims of different widths.

Considering the above, it is apparent that the conventional flap, which is roughly of V or U shape, as generally manufactured, must be made in various widths and with various cross sectional sets to accommodate these various tire sizes and their attending rim widths. It would be unduly expensive to attempt to provide separate and distinct mold equipment for as many sizes of flaps as there are tires with which they are to be associated. It has therefore become the practice, in the interest of reducing the number of sizes of flaps manufactured and carried in stock by dealers, to permit the use of one size and type of flap for a certain limited range of sizes of tires. In this way only one size flap is an absolute fit for one size tire. For the other sizes, above and below the standard of perfection, the fit of the flap is necessarily merely approximate.

In view of the accepted standard of manufacture, implying the use of trough-shaped molded flaps with free edges that are practically inextensible, it is apparent that a misfit flap—that is, when used with an under or over size tire—will have either one or the other of the following defects. If applied on such a tire that the free edges of the flap are unduly converged toward each other the material along these peripheral free edges will be subjected to considerable stress, frequently resulting in peripheral buckling or creasing in the upstanding flange, or in some cases to definite tearing of the free edges. If applied on such a tire that the free edges are unduly widened—that is, when presenting the aspect of a greater flare than normal, the upstanding free edges will be excessively long for the casing and will necessarily have to adjust themselves by compression, thus tending to form radially displaced buckles or creases extending into the free edges.

In either of the above cases, where flaps are "long or short", the inequalities set up tend to pinch or chafe the inner tube, thereby resulting in the premature destruction of both members.

Being cognizant of the defects in existing types of flaps it has become the objective of this invention to radically improve these articles along the following lines:

To provide a flap that has free edges, self adjustable to a considerable range of tire sizes.

To provide a character of free edge that is capable of absorbing and evenly distributing excesses or deficiencies in length without generating harmful buckles or creases.

To provide certain characteristic edge formation whereby the article may be made economically in straight molds, and thereafter curled into form at the time of applying.

With these and other objects in view, as more specifically developed in the following description and claims, this invention comprises the novel construction now described with reference to the accompanying drawing.

Figure 1:
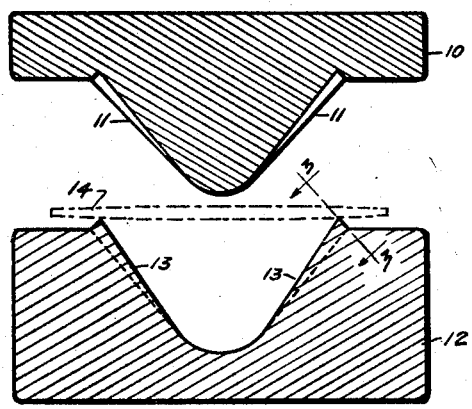
Figure 1, shows, in cross section, the usual mold equipment for forming the preferred type of flap. The unmolded stock being indicated by broken lines between the halves of the open mold.
Figure 2:
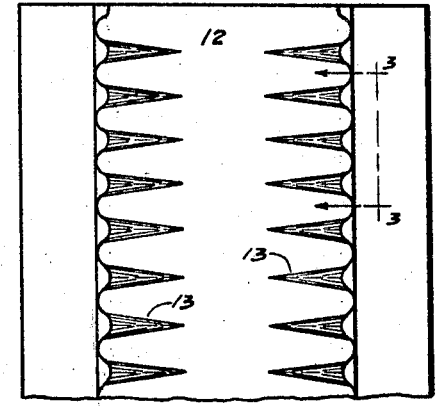
Fig. 2, shows a top view of the lower half of a portion of the mold illustrated in Fig. 1.
Figure 3:
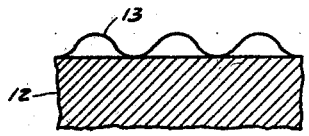
Fig. 3, shows a fragment of the outer edge of the convolution of the mold; for instance, as through a plane 3—3 in the direction of the zone, 3—3, indicated on Figs. 1 and 2.

With specific reference to the drawing numeral 10 represents the upper section of a mold having tapered convolutions 11 on either side of its convex face. Numeral 12 represents the lower half of the mold body having registering convolutions 13 corresponding with similar portions 11 in the upper half. The uncured flap 14 is illustrated between the mold halves, in broken lines, and the finally cured article, with convolutions 15 impressed therein, is shown in Fig. 4.

Figure 4:
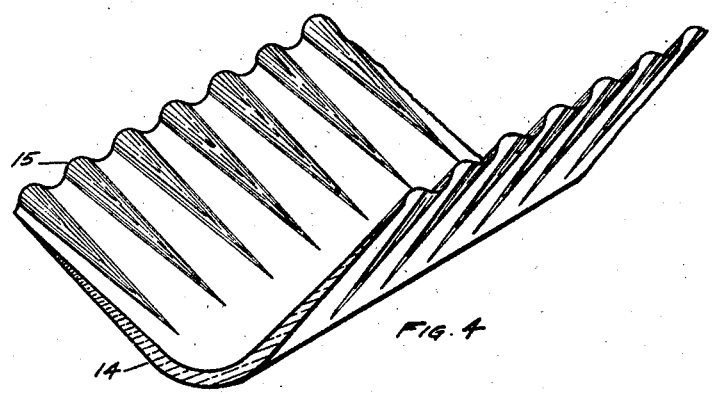
Fig. 4, shows a fragment of a fully molded flap, enlarged, to illustrate the final result of the molding operation.

In the preferred form the mating mold sections are made in straight lengths as a matter of manufacturing economy, and the resulting product is shown in Fig. 4, as a straight, trough-like strip, with fluted free edges diminishing in amplitude toward the bottom.

It is equally feasible to provide mold members with a curvature corresponding in some degree with the ultimate curvature of the installed flap on its rim, but a curved form is rather expensive to produce and expensive to operate, therefore, the straight type is preferred.

The form and dimensions of the convolutions impressed in the free edges of the flap may be varied at will to suit the requirements of individual choice, and, of course, must be quite different in a longitudinally straight molded flap from those appropriate for one that is produced in a curved mold.

It is apparent that the type of flap shown in Fig. 4, may be bent, longitudinally, about the interior of a tire casing and so designed that the excess in the free edges will be completely absorbed by the incidental elongation of these portions during the operation. As bending proceeds, the excesses are quite uniformly absorbed throughout the length of the article whereby a desirable smooth lay along the interior of the casing will result.

As previously stated, the fluted edge flap is inherently well adapted to conform its lay to tires of different diameters, within reasonable limits. The provision of adaptable excesses, uniformly apportioned throughout the free edges insures that the material of those portions will become uniformly absorbed and distributed over the entire area of contact with the entire casing, without accumulation or buckles appearing; thereby eliminating a chief defect of the old style flap.

The flap of Fig. 4, is preferably of the flaring V shape, but could as well be of any desired cross sectional contour. In fact, it could be molded virtually flat—all as preferred by different manufacturers to meet varying situations.

The flap may be made of the conventional rubberized fabric ply material with tapering free flange edges, or, if desired, of a suitable rubber compound to the exclusion of fabric insertions. In either event it may be molded in the usual manner in some such mold as that shown, or otherwise shaped.

Having now fully described a preferred form of my invention, by way of illustration of the basic principle, what I claim is:

1. A tire flap characterized by the provision along its free edges of an excess of material.

2. A tire flap characterized by the provision along its free edges of an excess of material attained by fluting.

3. A tire flap characterized by the provision along its free edges of an excess of material attained by flutings attaining their greatest amplitude at the said edges.

4. A tire flap characterized by the provision along its free edges of an excess of material attained by flutings attaining their greatest amplitude at the said edges and extending laterally a distance less than the width of said flap.

5. A tire flap molded to a trough-like cross sectional contour characterized by the provision along its free edges of an excess of material.

6. A tire flap molded to a trough-like cross sectional contour characterized by edges of greater extensibility than intermediate portions attained by flutings attaining their greatest amplitude at the said edges.

7. A tire flap molded to a trough-like cross sectional contour and longitudinally straight characterized by extensible edge portions formed by an excess of fluted material of greatest amplitude at said edges proportioned whereby said excess is dissipated when the flap is circularly distorted.

In testimony whereof I affix my signature.

EDISON G. HULSE.